United States Patent
Mitaru et al.

(10) Patent No.: US 10,893,303 B1
(45) Date of Patent: Jan. 12, 2021

(54) STREAMING CHUNKED MEDIA SEGMENTS

(71) Applicant: Amazon Technologies, Inc., Seattle, WA (US)

(72) Inventors: Matei Berceanu Mitaru, Portland, OR (US); Mark DeSpain, Hillsboro, OR (US); Benjamin Aldouby Schwartz, Baltimore, MD (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/264,196

(22) Filed: Jan. 31, 2019

(51) Int. Cl.
  *H04N 7/173* (2011.01)
  *H04N 21/234* (2011.01)
  *H04N 21/239* (2011.01)
  *H04N 21/235* (2011.01)
  *H04N 21/845* (2011.01)

(52) U.S. Cl.
  CPC ... *H04N 21/23406* (2013.01); *H04N 21/2353* (2013.01); *H04N 21/2393* (2013.01); *H04N 21/8456* (2013.01)

(58) Field of Classification Search
  CPC ......... H04N 21/23406; H04N 21/4325; H04N 21/44004; H04N 21/23439
  USPC .................................................. 725/94, 116
  See application file for complete search history.

(56) References Cited

U.S. PATENT DOCUMENTS

| | | | |
|---|---|---|---|
| 6,831,912 B1* | 12/2004 | Sherman | H04L 1/0001 370/349 |
| 8,949,487 B1* | 2/2015 | Reed | G06F 5/10 710/29 |
| 2016/0021164 A1* | 1/2016 | Chakarapani | H04L 67/02 709/224 |
| 2018/0035176 A1 | 2/2018 | Stockhammer | |

* cited by examiner

*Primary Examiner* — Jivka A Rabovianski
(74) *Attorney, Agent, or Firm* — Knobbe, Martens, Olson & Bear, LLP (57) ABSTRACT

A content streaming system and methodology for facilitating the management of content streaming. A content delivery service provides streaming content that is organized according to a set of encoded content chunks. An encoding component generates encoded chunk data for transmission to requestors. A content delivery management component can determine configuration information that indicates the size of the content chunks. The content delivery management component can then receive encoded data but will not replicate and propagate the received encoded data to distribution endpoints of the content delivery service until complete content chunks are ready for transmission. A video playback application processes the set of encoded content chunks to dynamically form a content segment for live video streaming.

20 Claims, 8 Drawing Sheets

STREAMING CHUNKED MEDIA SEGMENTS

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a content delivery network ("CDN") service provider. As with content providers, CDN service providers also provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or the quality of delivery service.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, content providers can provide content to requesting users. With regard to video content, a content provider can implement a video packaging and origination service that operable to encode content according to one or more encoding formats for delivery of the video content to requesting users. Additionally, the content provider can implement a delivery service that receives the encoded content and can distribute the content to various endpoints for transmission to a number of requesting clients. Illustratively, a video packaging and origination service of the content delivery service indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a video packaging and origination service can also provide advanced video transmission features such as just-in-time packaging of video content, digital rights management ("DRM") encryption, time-shifting, bitrate selection, catch up TV, and more.

To deliver content, content providers can organize requested content, such as a video file, into multiple segments that are then transmitted to requesting devices, segment by segment. For example, in a video stream, each segment typically accounts for 2-10 seconds of video rendered on a receiving device. To provide content, the video packaging and origination service can encode individual content segments and transmit the encoded segments to requesting user devices directly via the content delivery service or via a CDN. Typically, the video packaging and origination service will complete the encoding of the segments prior to transmission.

In some embodiments, a video player on the user device may be configured to receive a buffer a number of encoded segments prior to beginning the rendering of the content segments on the user device. For example, a user device may be configured to buffer three or four segments prior to beginning playback. Accordingly, by way of illustrative example, if content segments are associated with 10 second intervals, the player device would incur a latency of the product of the length of the content segment and the number of buffered segments (e.g., 10 second segments*3 segments buffered=30 seconds of latency). Such latencies for live streaming events affect overall performance of the user device or user experience.

Video segments can be encoded according to a defined bitrate and format, which generally defines the number of bits of data that are encoded over a measured amount of time and the specific software algorithm and resulting content representation format utilized to encode the data for transmission. For video files, bitrates are typically measured according to how many kilobits or megabits of data are processed over a second of time. By way of example, a data file that corresponds to 1 megabyte of video data encoded in one second would be considered to have an encoding bitrate of 8 mbps (e.g., 8 megabits per second) while a lower definition video file that corresponds to 45 kilobytes of video data processed in one second would be considered to have an encoding bitrate of 360 kbps (e.g., 360 kilobits per second).

In some embodiments, it may be possible for the content provider to facilitate variable bit rate encoding to enable for variances in the encoding bitrates of individual segments of a video file. In such embodiments, the content provider can generate multiple encoded bitrate versions or combinations of encoded bitrates and formats of individual video file segments. The content provider can then make at least a subset of the multiple bitrate encoded versions available to clients responsive to a request for a particular encoded bitrate version and format. Generally, a content provider can generate a catalog identifying the video segments and encoded bitrates for each identified video segment. The catalog can be written into a manifest file that is provided to individual client computing devices that have requested the video file. Thereafter, once all the versions of an encoded segment are received by the packaging and origination service, the packaging and origination service is available to receive and process requests for encoded content. More specifically, client computing devices, through a respective software application, can request individual video segments according to the available encoded bitrates and formats as published in the manifest file by applying heuristic rules that define request behavior for media segment requests.

To receive content, a client computing device can simply request content having a fixed encoding rate or have a fixed encoding rate selected in response to a streaming content request. Such a fixed encoding rate approach can be deficient in facilitating variance of the encoding bitrate (both positive and negative) based on factors, such as network bandwidth, client computing device utilization, quality demands, and the like. In addition to the association of the encoding bitrate, video segments can be further defined by associating the encoding bitrate with the encoding format utilized by the encoder to generate the output stream. The encoding format can correspond to a content representation format for storage or transmission of video content (such as in a data file or bitstream). Examples of encoding formats include encoding formats in which encoded content can be processed and transmitted in a set of segments. Such encoding formats include, but are not limited to, the motion pictures expert group ("MPEG) MPEG-2 Part 2, MPEG-4 Part 2, H.264 (MPEG-4 Part 10), H.265 high efficiency video coding ("HEVC"), VP9, and AOMedia Video 1 ("AV1"), and the like.

In addition to incorporating segmenting of video segments, in some embodiments, content providers can further subdivide video segments to reduce latency by allowing portions of the content to be transmitted and rendered prior to completion of the entire encoding process. For example, in applications related to live or substantially live video streaming, a content provider can look to minimize latency by further processing video segment data. For example, in accordance with one approach, such as found in the Common Media Application Format ("CMAF"), content segments can be broken down into a plurality of media fragments that can be transmitted to form video segments. Still further, individual media fragments can be further broken down into a plurality of sub portions, or chunks, that can be utilized to form the media fragments. The individual media segment chunks can be transmitted in accordance with networking protocols, such as HTTP, the support the transmission of data chunks. Each chunk respectively includes one or more media samples.

Generally, the utilizing of segment fragments and segment chunks can facilitate the reduction of transmission latencies for live streaming events. With reference to the previous example, a 10 second media segment can be broken down into five fragments of two seconds each. Each fragment can be further broken down into 1 second chunks that can be individually transmitted. Additionally, a media player on the user device can begin buffering and playback of the media chunks without incurring latencies associated with buffering an entire media segment. However, such general approaches do not address potential challenges associated with processing buffered media chunks to form the segments. For example, in situations in which the media player experiences a rebuffering event, the media player incurs additional latencies associated with the buffering of full segments. Additionally, such general approaches do not address potential challenges associated with applying heuristic rules that define subsequent segment request behavior for media segment requests. For example, a media player configured with segment-based heuristic rules do not have the ability to utilize fragment or chunk based information to evaluate such heuristic rules. Still further, in the event that a media player or other application receives incomplete chunk data from a content delivery service, the media player cannot typically form content segment data, which requires retransmission of the data and a lag in the playback of the encoded content.

To address at least a portion of the inefficiencies described above with regard to transmission of encoded content segments, a content delivery and management system and method for processing a plurality of encoded content segments transmitted as a plurality of individual encoded segment fragment chunks is provide. More specifically, aspects of the present application correspond to utilization of processing routines for receiving a plurality of a plurality of encoded segment chunks. Illustratively, encoded content is associated with two or more segments. Individual segments are then further organized into a plurality of fragments, which are further organized into a plurality of chunks.

In accordance with aspects of the present application, a content delivery management component of the content delivery service can receive encoded data generated by an encoding service/component and buffer the encoded data prior to replication and distribution of the encoded data to the media distribution endpoints of the content delivery service. Typically, however, content delivery services do not have information corresponding to the size of the segment chunks. Rather, many content delivery service simply replicate and transmit encoded data as the encoded data is generated to the distribution endpoints or CDN for delivery to the clients. If the content delivery service receives less than a full content segment chunk and an error occurs in the encoding or in the transmission, each individual media endpoint would receive the portion of the encoded content that was less than a content segment chunk. In such situations, the received content (e.g., less than a full chunk) would not be playable by most media player applications. Accordingly, the content delivery service has replicated and propagated unusable encoded content to a plurality of endpoints, but the network and processing resources to replicate and distribute the incomplete encoded data would be unnecessarily consumed.

The present disclosure incorporates additional logic in a content delivery service that facilitates the discover of encoded content chunk size and buffering of received chunk data until complete segment chunks are ready for transmission to media endpoints. As a content delivery service receives encoded data, the content delivery service, through a content delivery management component, can discover the segment chunk size utilized by the encoder. For example, the content delivery service can inspect packet headers to determine the specification of an encoded segment content chunk size or information that can be utilized to determine encoded segment content chunk size. Based on the discovered size, the content delivery service can continue to receive and buffer the encoded segment chunk data from an encoding component until a complete (or multiples) of encoded segment chunk has been received. At that point, the content delivery service can replicate and distribute the complete encoded segment chunk to the plurality of delivery endpoints.

Although aspects of the present application will be described with regard to illustrative examples related to specific bitrate encoding, encoding formats and combinations of bitrate encoding and formats as well as encoded segment fragment and chunking algorithms, one skilled in the relevant art will appreciate that the examples are illustrative in nature and should not be construed as limiting. Still further, illustrative examples will be discussed with regard to specific data structures or rules specified by the International Organization for Standardization ("ISO") and the International Electrotechnical Commission ("IEC") technical standards, and in particular to one or more versions of the ISO Base Media File Format defined in ISO/IEC 14496-12. Reference to the ISO/IEC standards is intended solely to be illustrative and should not be construed as limiting to any particular standard, version of the standard, or respective data structure.

Figure 1:
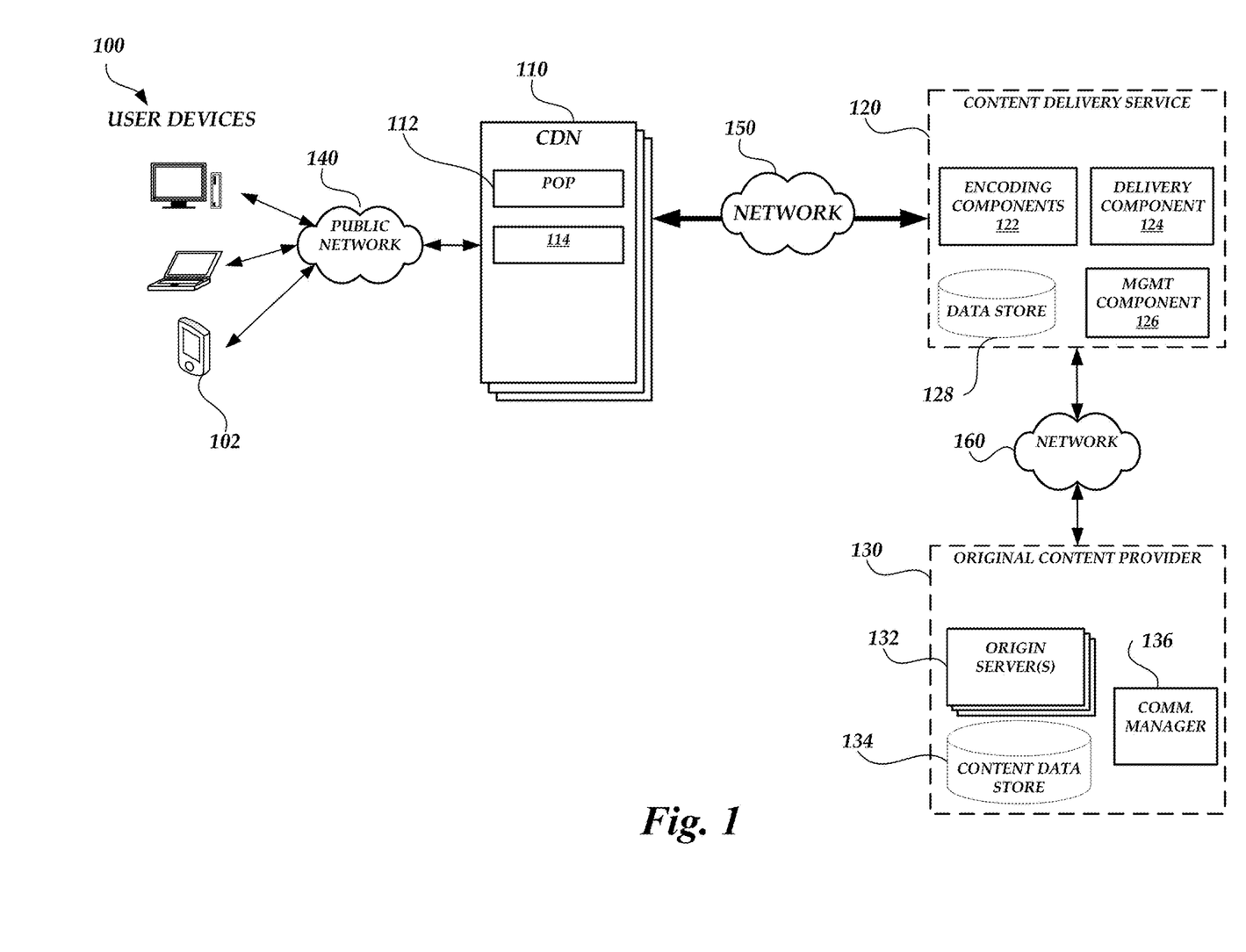
FIG. 1 is a block diagram of a content delivery environment that includes one or more user devices, a content delivery service and an original content provider according to one embodiment.

FIG. 1 illustrates a general content delivery environment 100 for delivering content from original content providers to user devices. The content delivery environment 100 includes a plurality of devices 102 utilized by individual users, generally referred to as client computing devices, to request streaming or download content from a content delivery service 120. Illustratively, the content delivery service 120 indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Smooth Streaming, Real Time Messaging Protocol ("RTMP"), and the like. Based on consumer demand, a video packaging and origination service can also provide advanced video transmission features such as just-in-time packaging of video content, digital rights management ("DRM") encryption, time-shifting, bitrate selection, catch up TV, and more. Additionally, as will be described in greater detail below, the encoded content segments can be further processed in accordance with additional communication protocols, such as the common media application format ("CMAF"). The content can be illustratively provided by one or more origin sources, such as original content provider 130.

User devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance (e.g. a thermostat or refrigerator), controller, digital media player, watch, glasses, a home or car device, Internet of Thing ("IoT") devices, virtual reality or augmented reality devices, and the like. Each user device 102 may optionally include one or more data stores (not shown in FIG. 1) including various applications or computer-executable instructions, such as web browsers or media player software applications, used to implement the embodiments disclosed herein. As will be explained in greater detail below, the applications can be configured to process encoded content segments organized according to fragments and chunks. Illustrative components of a user device 102 will be described with regard to FIG. 2.

In some embodiments, a CDN service provider 110 may include multiple edge locations from which a user device can request content. Individual edge locations 112 may be referred to herein as a point of presence ("POP"), where a POP 112 is intended to refer to any collection of related computing devices utilized to implement functionality on behalf of one or many providers. POPs are generally associated with a specific geographic location in which the computing devices implementing the POP are located, or with a region serviced by the POP. As illustrated in FIG. 1, in some embodiments the POP 112 can include one or more media processing components 114 for processing processed encoded content streams as will be described herein. For example, individual POPs may receive processed, encoded contents streams and be able to transmit or incorporate additional fragments and chunking algorithms as described herein utilizing a media processing component 114. The CDN service provider 110 may include multiple POPs located in different geographic locations so that user devices can communicate with a nearby a POP to retrieve content, thereby reducing the latency of delivering requested content.

Networks 140, 150, 160 may be any wired network, wireless network, or combination thereof. In addition, the networks 140, 150, 160 may be a personal area network, local area network, wide area network, cable network, fiber network, satellite network, cellular telephone network, data network, or combination thereof. In the example environment of FIG. 1, network 140 is a global area network (GAN), such as the Internet. Protocols and components for communicating via the other aforementioned types of communication networks are well known to those skilled in the art of computer communications and thus, need not be described in more detail herein. While each of the client computing devices 102 and content delivery service 120 are depicted as having a single connection to the network 140, individual components of the client computing devices 102 and content delivery service 120 may be connected to the network 130 at disparate points. Accordingly, communication times and capabilities may vary between the components of FIG. 1. Likewise, although FIG. 1 is illustrated as having three separate networks 140, 150, 160, one skilled in the relevant art will appreciate that the content delivery service 120 may utilize any number or combination of networks.

In accordance with embodiments, the content delivery service 120 includes one or more servers for receiving content from original content providers 130 and processing the content to make available a set of received encoded bitrate segments. As described in further detail below, the content delivery service 120 includes a plurality of encoding components 122 utilized to transmit encoded data streams to the user devices 102. The content delivery service 120 also includes one or more servers for generating encoded, processed content streams as described herein. The encoding components 122 may be distributed according to geographic criteria or availability zones to facilitate delivery or access to encoded content. Still further, although illustrated as separate components, the encoding components 122 may be integrated into a single component that functions as a combined ingress and egress component for receiving and transmitting encoded content from the content delivery service 120.

The content delivery service 120 can further include a delivery component 124 that represents a content distribution component or service that receives encoded content segments from the encoding content component 122 and distributes the encoded content for distribution to client devices 102 or CDN 110. As described above, in one embodiment, the delivery component 124 includes a plurality of distribution endpoints located at various logical endpoints that function as distribution endpoints for different network clients. In this regard, the delivery component 124 includes additional components or a plurality of components that function as individual delivery endpoints. As further described above, the delivery component 124 can receive encoded content segment chunk data from the encoding components 122 as the content is being encoded. Illustratively, the delivery component 124 can include additional logic or functionality to determine the encoded content segment chunk size and limit the distribution of received encoded content segment chunk data until complete chunks (or multiples) have been received.

The content delivery service 120 can also include management services 126 for generating synchronization information utilized by the encoders, such as sequence numbers corresponding to the set of encoded segments, time stamp information related to a relative time of the encoded segments or from which relative time of encoded segments will be based, and the like. The content delivery service 120 can further include a data store 128 for maintaining generated encoded data for collection and transmission.

It will be appreciated by those skilled in the art that the content delivery service 120 may have fewer or greater components than are illustrated in FIG. 1. Thus, the depiction of the content delivery service 120 in FIG. 1 should be taken as illustrative. For example, in some embodiments, components of the content delivery service 120 may be executed by one more virtual machines implemented in a hosted computing environment. A hosted computing environment may include one or more rapidly provisioned and released computing resources, which computing resources may include computing, networking or storage devices. Additionally, while such components are illustrated as logically being logically grouped in FIG. 1, one skilled in the relevant art will appreciate that one or more aspects of the present application can include the content delivery service 120 as being implemented in multiple geographic areas. Additionally, not all geographic areas hosting portions of the content delivery service 120 will necessary have all the same components or combination of components.

With continued reference to FIG. 1, the content delivery environment 100 also includes original content providers 130. Illustratively, the original content provider can include a plurality of encoders 132 for generating multiple encoded streams for transmission to the content delivery service 120. In some embodiments, the original content provider the original content provider 130 can further include synchronization services 136 for generating synchronization information utilized by the encoders, such as sequence numbers corresponding to the set of encoded segments, time stamp information related to a relative time of the encoded segments or from which relative time of encoded segments will be based, and the like. The original content provider 130 can further include a data store 134 for maintaining encoded data for transmission.

Figure 2:
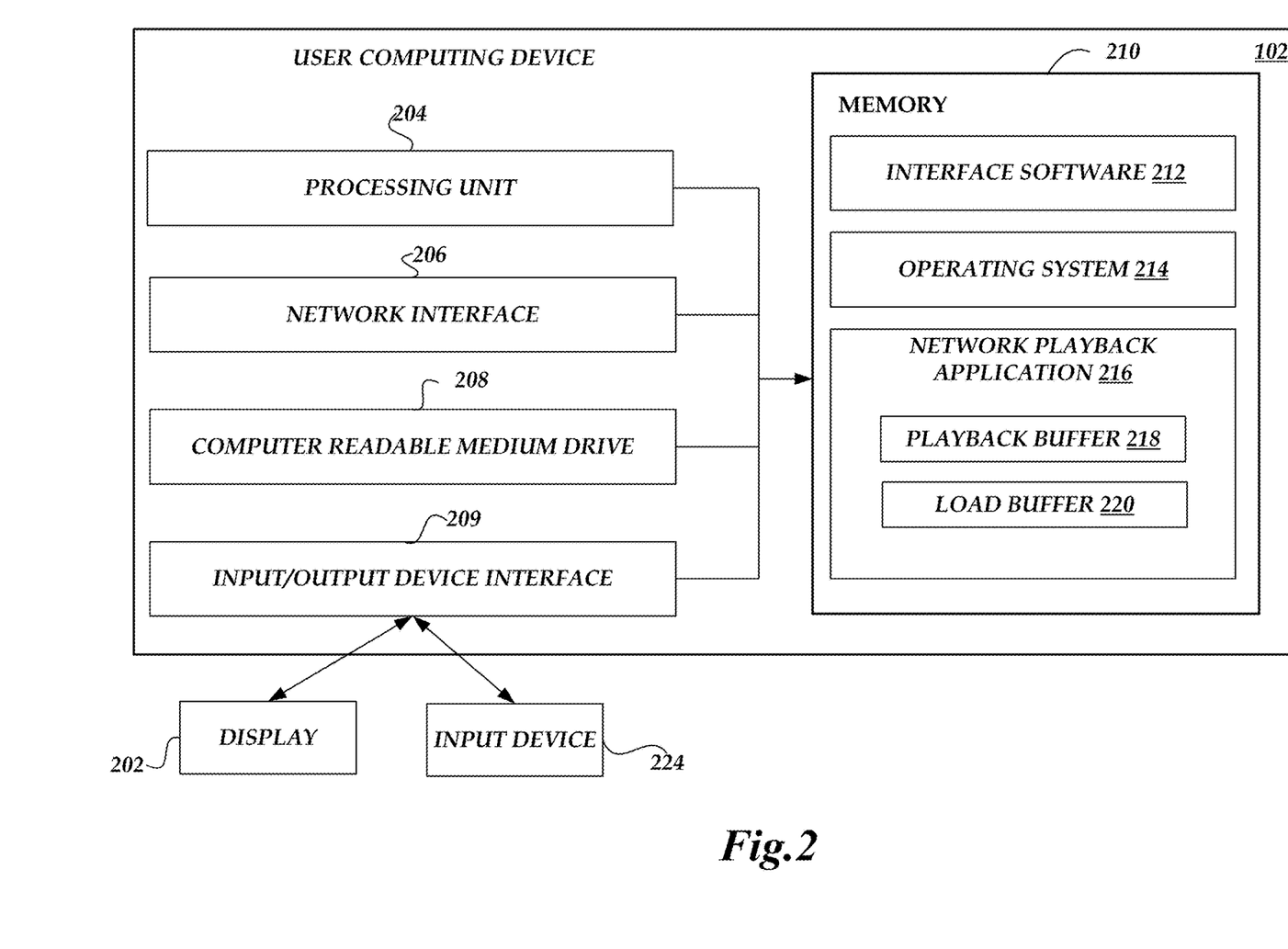
FIG. 2 is a block diagram of illustrative components of a user computing device configured to remotely process content in accordance with an illustrative embodiment.

FIG. 2 depicts one embodiment of an architecture of an illustrative user computing device 102 that can generate content requests and process encoded content in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, a computer readable medium drive, an input/output device interface 209, an optional display 202, and an input device 224, all of which may communicate with one another by way of a communication bus.

The network interface 206 may provide connectivity to one or more networks or computing systems, such as the network 140 of FIG. 1 and the content delivery service 120, the CDN service provider 110, or the original content provider 130. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store interface software 212 and an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes a network application 216, such as browser application or media player, for accessing content and communicating with the content delivery service 120. Additionally, in some embodiments, the memory 210 can include a media processing component 218 for processing processed, encoded content streams and reconstituting one or more content streams as described herein. Included in the media processing component 218 are a loading buffer for receiving chunks and a playback buffer for use in rendering content on the user devices. Aspects of the utilization of the two buffers are solely illustrative in nature and not required for processing of chunked data.

Figure 3:
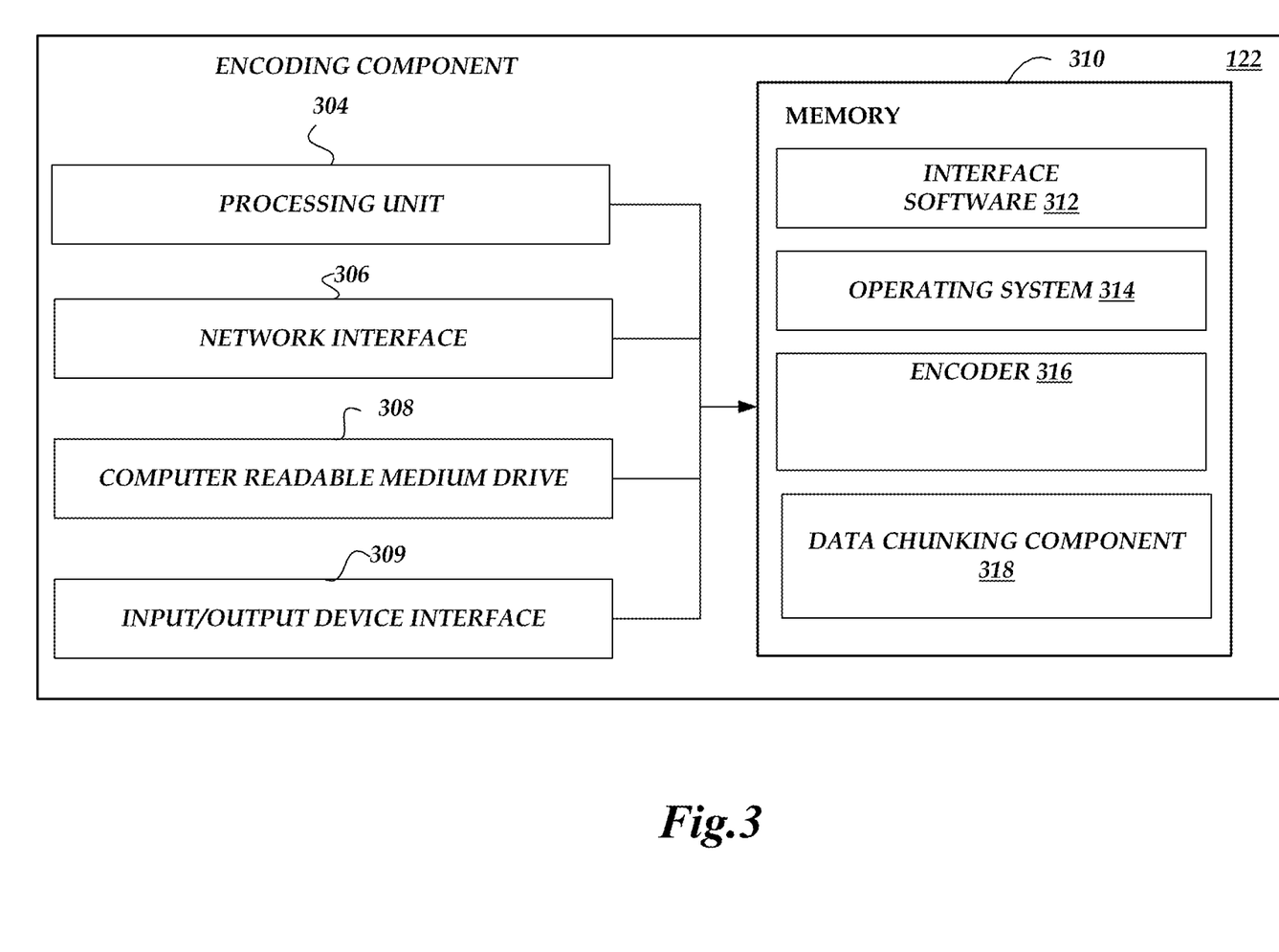
FIG. 3 is a block diagram of illustrative components of a content encoding component configured to manage and transmit encoded content to requesting entities in accordance with an illustrative embodiment.

FIG. 3 depicts one embodiment of an architecture of an illustrative server for functioning as an encoding component 122 as described herein. As described above, the content delivery service 120 includes multiple encoding components 122 (or nodes) that facilitate processing encoded segment content requests from different requesting entities, such as CDN service provider 110 or user devices 102. The general architecture of the encoding component 122 depicted in FIG. 3 includes an arrangement of computer hardware and software components that may be used to implement aspects of the present disclosure. As illustrated, the encoding component 122 includes a processing unit 304, a network interface 306, a computer readable medium drive 308, an input/output device interface 309, all of which may communicate with one another by way of a communication bus. The components of the encoding component 122 may be physical hardware components or implemented in a virtualized environment.

The network interface 306 may provide connectivity to one or more networks or computing systems, such as the network 140 or network 160 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the encoding component 122 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the encoding component 122. The memory 310 may further include computer program instructions and other information for implementing aspects of the present disclosure. For example, in one embodiment, the memory 310 includes interface software 312 for receiving and processing content requests from requesting entities. Additionally, the memory 310 includes an encoding component 316 for generating encoded content segments. Additionally, the encoding component 122 can further include a data chunking component 318 that generates processed, encoded components into fragments and chunk based on the encoded content segments provided by the encoding component 316 as described herein. By way of illustrative example, the data chunking component 318 can facilitate the generation of encoded chunks in accordance with CMAF. Additionally, although data chunking component 318 is illustrated as a module to the encoding component 122, the data chunking component may be implemented as a stand-alone application in the content delivery service 120.

As previously described, in accordance with embodiments of the present application, encoded content for streaming can be subdivided into a set of segments transmitted and rendered by a media processing application on the user device 102. Examples of such an approach can correspond to the DASH and HLS communication protocols. To mitigate latencies associated with the live streaming, the encoded segments can be further broken into a plurality of encoded content fragments that sum up to individual segments. Additionally, individual fragments can be further broken down or sub-divided into encoded content chunks that sum up to individual fragments. An illustrative example of a communication protocol that facilitates such interaction corresponds to the CMAF communication protocol.

Figure 4:
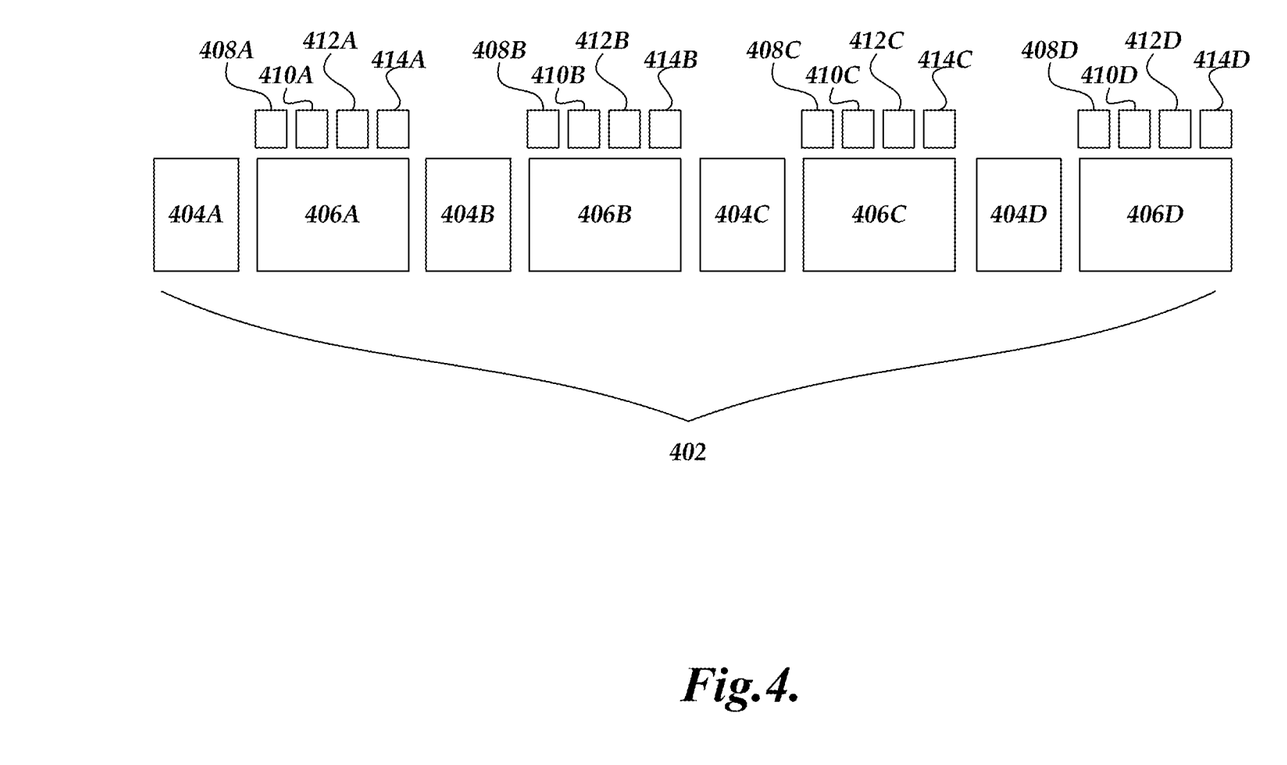
FIG. 4 is a block diagram illustrative of the representation of a portion of an encoded content segment utilizing encoded content fragments and encoded content chunks in accordance with an illustrative embodiment.

With reference now to FIG. 4, a block diagram 400 illustrative of the representation of a portion of an encoded content segment utilizing encoded content fragments and encoded content chunks will be described. The block diagram 400 represents a single fragment 402 that with other fragments make up an encoded content segment. By way of illustration, the fragment 402 is made up of three chunks. Illustratively, individual chunks are made up of a first portion, such as a Movie Fragment Box ("moof"), followed by one or more payload portions, such as Media Data Boxes ("mdat") portions. Illustratively, the first portion of the chunks includes information that identifies one or more aspects of the chunk including the type of data represented by the payload portion, number of media samples included in the payload portions, durations of the samples in the payload samples, timescale information for the media samples, and the like. For example, the first portion can include markers, such as flags or other identifiers, that the payload portion corresponds to a marker or identifier utilized to delineate information between two or more segments. For example, the payload portion can include an Instantaneous Decoding Refresh ("IDR") marker that is interpreted as a frame in which no frame subsequent to the IDR marker can reference a previous frame prior to the IDR marker. As described herein, in one embodiment, the content delivery service 120 can determine characteristics or attributes of the encoded content segments chunks, such as the size, by inspection of the portions of the chunks.

As illustrated in FIG. 4, each of the three fragments include a first portion 404A, 404 B, 404 C. As will be described below, information from the first portions can be utilized to form an initial encoded content segment from a set of received content chunks. Additionally, information from the first portions can also be utilized to allow for the utilization of segment-based heuristics for a set of received encoded content chunks. With continued reference to FIG. 4, each of the chunks of the fragment 402 includes a payload portion 406B, 406C, 406D. Each of the payload portions includes a plurality of media samples 408, 410, 412, and 414 (A-D).

Figure 5:
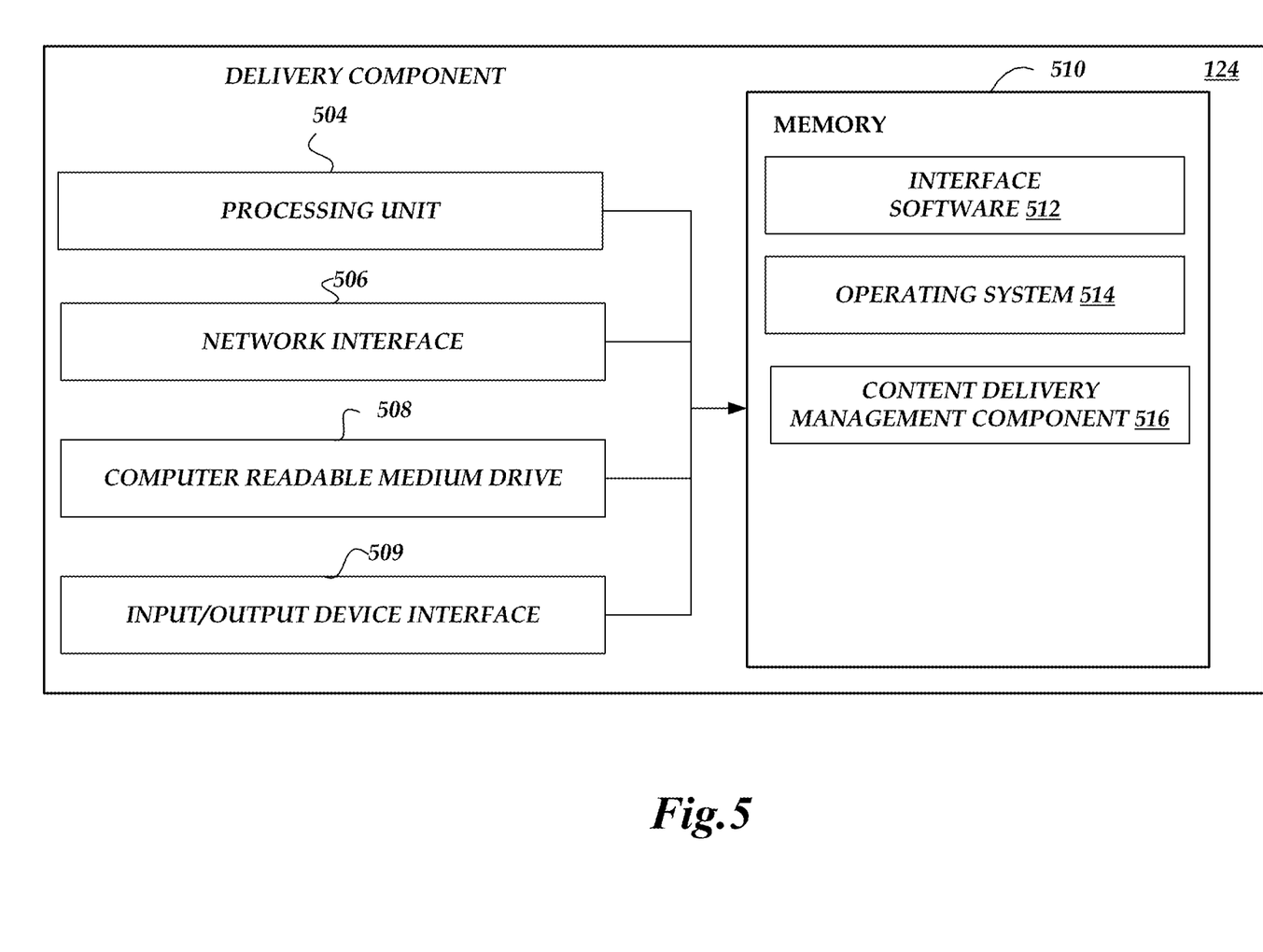
FIG. 5 is a block diagram of illustrative components of a content delivery service configured to manage and transmit content in accordance with an illustrative embodiment

FIG. 5 depicts one embodiment of an architecture of an illustrative computing device for implementing various aspects of the content delivery component 124 in accordance with aspects of the present application. The content delivery component 124 can be a part of the instantiation of virtual machine instances. Alternatively, the computing device may be a stand-alone device independent of the instantiated virtual machines. Accordingly, FIG. 5 illustrates the functionality associated with the management of encoded segment chunk data and additional components or functions may also be implemented.

The general architecture of the hardware serial adapter management component 118 depicted in FIG. 5 includes an arrangement of computer hardware and software components that may be used to implement aspects of the present disclosure. As illustrated, the content delivery component 124 includes a processing unit 504, a network interface 506, a computer readable medium drive 508, an input/output device interface 509, all of which may communicate with one another by way of a communication bus. The components of the content delivery component 124 may be physical hardware components or implemented in a virtualized environment.

The network interface 506 may provide connectivity to one or more networks or computing systems, such as the network of FIG. 1. The processing unit 504 may thus receive information and instructions from other computing systems or services via a network. The processing unit 504 may also communicate to and from memory 510 and further provide output information. In some embodiments, the content delivery component 124 may include more (or fewer) components than those shown in FIG. 5.

The memory 510 may include computer program instructions that the processing unit 504 executes in order to implement one or more embodiments. The memory 510 generally includes RAM, ROM, or other persistent or non-transitory memory. The memory 510 may store an operating system 514 that provides computer program instructions for use by the processing unit 504 in the general administration and operation of the hardware serial adapter management component 118. The memory 510 may further include computer program instructions and other information for implementing aspects of the present disclosure. For example, in one embodiment, the memory 510 includes interface software 512 for receiving and processing information. Memory 510 includes a content delivery management component 516 for configuring or managing the distribution of encoded content segment chunks or portions of chunked data. As described above, the content delivery management component 516 can determine specified encoded content segment chunk size information and manage the release of encoded segment chunk data based on the determined size as described herein.

As specified above, in one embodiment, the content delivery component 124 illustrated in FIG. 5 can be implemented as physical computing devices or virtualized computing devices in a computing network. In another embodiment, the content delivery component 124 may be implemented as logical components in a virtual computing network in which the functionality of the content delivery component 124 is implemented by an underlying substrate network of physical computing devices. Thus, aspects of the present application should not be limited to interpretation requiring a physical, virtual or logical embodiment unless specifically indicated as such.

Figure 6:
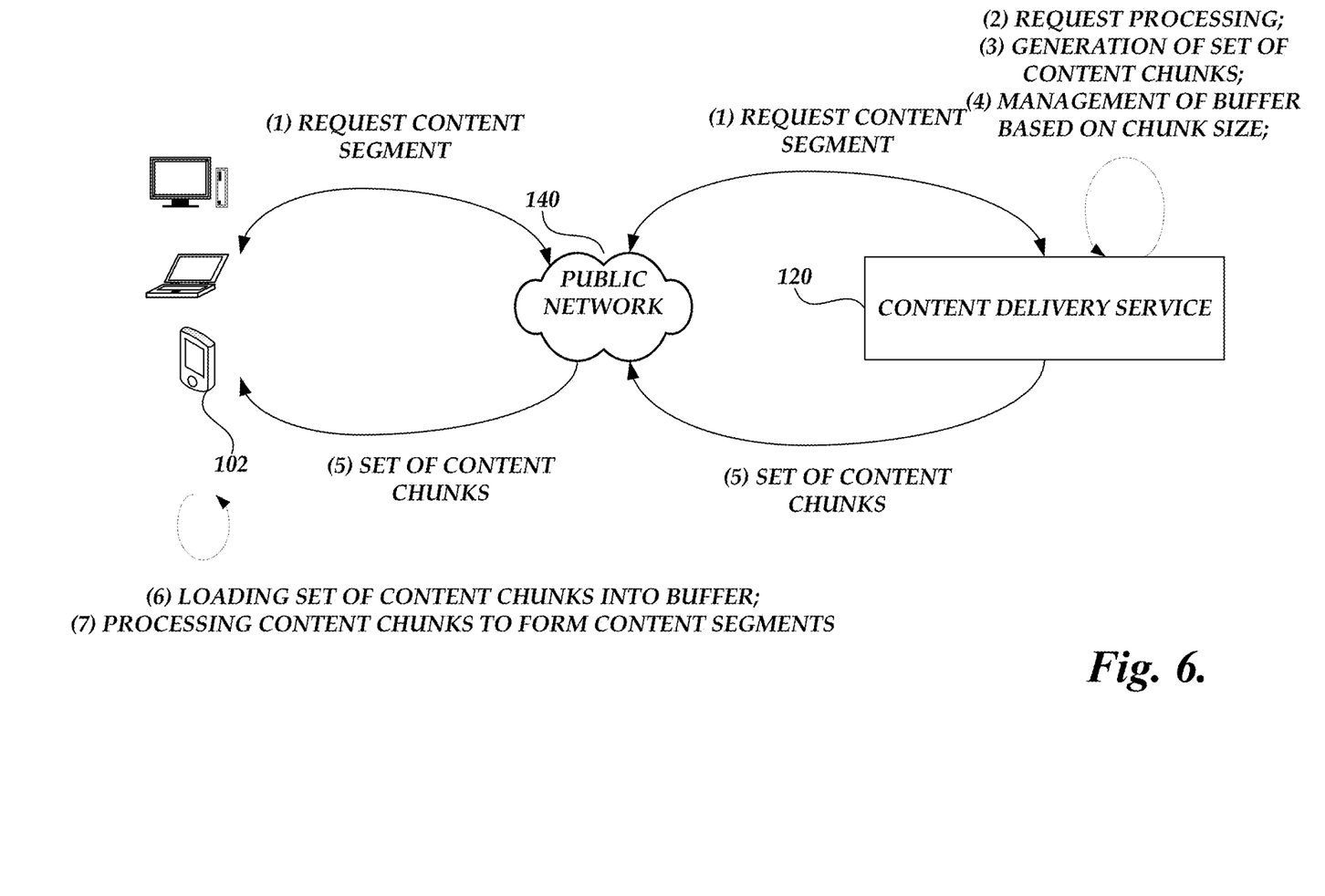
FIG. 6 is a block diagram of the content delivery environment of FIG. 1 illustrating the interaction between a video packing and origination service, a content delivery service and user device for obtaining encoded content.

Turning now to FIG. 6, an illustrative interaction for the processing of encoded content segments utilizing encoded content fragments and chunks will be described. FIG. 6 will be illustrated with regard to interaction between a user device 102 and a content delivery service 120. However, the user device 102 may interact similarly with a CDN service provider 110. At (1), the user device 102, such as through the media processing component 218, transmits one or more requests for a content segment. Illustratively, the request corresponds to specific bitrate and format that is available from the content delivery service 120. Illustratively, the user device 102 request is received at specific endpoints of the content delivery service 120 or it is determined which content delivery service endpoint is most appropriate for the user device request.

At (2), the content delivery service 120 processes the received encoded segment requests to allow the content delivery service 120 to generate outgoing content streams. Illustratively, the processing of the request can include a number of additional interactions between the user device 102 and the content delivery service 120, including security protocols, handshaking protocols, and the like. At (3), the content delivery service 120, through encoding component 122, generates a set of encoded content chunks, such as in accordance with the CMAF communication protocol. For example, the encoding component 122 can begin generating encoded content segments as encoded content segment chunks as described above. Illustratively, the encoded content segment chunk data includes header information or other meta-data that identifies attributes of the encoded content segment chunks, including the specified size of the individual encoded content segment chunks.

As described above, the content delivery component 124 can receive the encoded segment chunk data from the encoder and buffer the received data prior to distribution to a plurality of endpoints that in turn distribute to the individual user devices or clients. At (4), the content delivery component 124 of the content provider manages the buffer of encoded content based on the chunk size. More specifically, the content delivery component 124 determines the size of the encoded segment chunks and monitors the buffer of received encoded content segment chunk data to determine whether at least one multiple of the encoded segment chunk data has been received. For example, the content delivery component 124 can inspect header information to determine a specified chunk size for the transmission or check meta-data. If the received encoded data does not correspond to the intended or specified chunk size, the content delivery component 124 will continue to buffer (or cause to be buffered) encoded content segment chunk data prior to transmission. If an error occurs in the generation of the remaining portions of the encoded data to form a complete chunk prior resulting in incomplete chunk data, the incomplete chunk data has never been replicated and distributed to the plurality of media delivery endpoints. Alternatively, if the received encoded content segment chunk data corresponds to the specified chunk size, the content delivery component 124 releases the buffer to allow the distribution endpoints to pass the encoded content segment chunk to be distributed.

At (5), the content delivery service 120, via a plurality of distributed endpoints that have individually received the encoded chunk data, transmits the set of encoded content chunks to the user device. Illustratively, as described above, the transmission of the encoded content chunks can leverage network protocols, such as HTTP, that facilitate the distribution of data chunks over a communication network. Illustratively, the user device 102 receives the chunks and attempts to form content segments in a manner such that there is a reduction in latency that would otherwise be associated with the transmission of data segments. More specifically, in some scenarios, such as related to rebuffering or refreshing of the content channel, the user device 102 attempts to dynamically form segments from the received encoded chunks.

At (6), the user device 102 stores the received encoded chunks in a load buffer. At (7), the user device 102 processes the set of chunks in the load buffer to form an initial segment. Illustratively, the user device 102 parses the set of chunks to identify a marker in the chunk information that is indicative of a reference frame, such as an IDR marker or flag. The user device 102 can utilize the found marker to identify the start of a next segment and utilize the following chunks to dynamically form the segment. Additionally, the user device 102 can then discard any chunks received prior to the chunk with the identified marker as these chunks will not form part of the segment. Illustratively, by dynamically forming segments from received encoded chunks, the user device 102 can provide the dynamically formed segments to the playback buffer in a manner to avoid latencies or delay. Such approaches are particularly relevant for live streaming or substantially live streaming events. Additionally, by limiting the receipt of the incomplete chunk data to the user device 102, the performance of the user device 102 is improved by avoiding additional latencies or potential performance degradation associated with trying to process incomplete chunk data.

Figure 7:
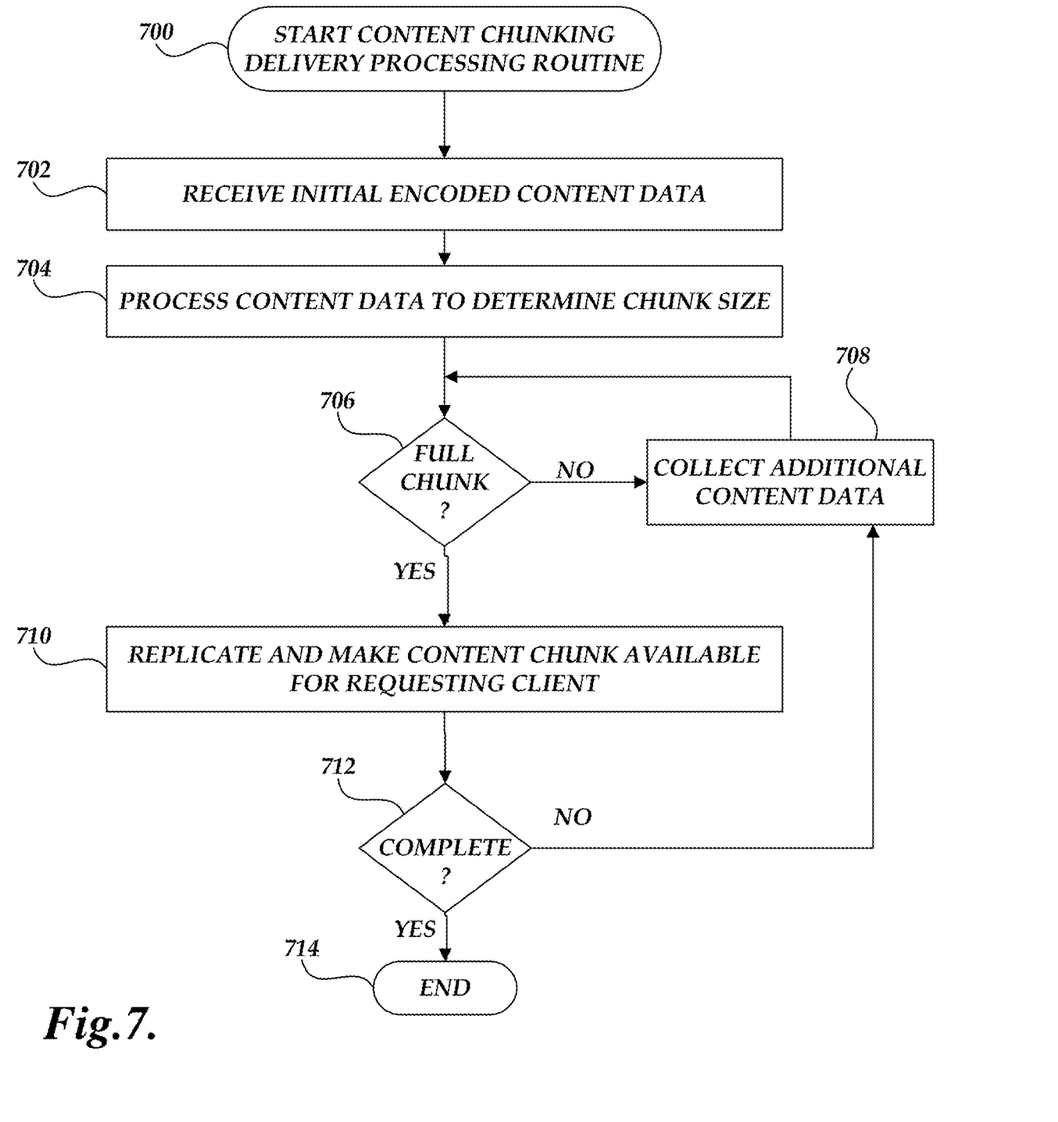
FIG. 7 is a flow diagram illustrative of a content chunking delivery processing routine implemented by a content delivery service in accordance with an aspect of the present application and FIG. 8 is a flow diagram illustrative of an initial content segment formation routine implemented by a user device in accordance with an aspect of the present application.

Turning now to FIG. 7, a flow diagram of a content chunking delivery processing routine 700 will be described. Illustratively, routine 700 can be implemented after the user device 102, such as through the media processing component 218, transmits one or more requests for a content segment. Illustratively, the request corresponds to specific bitrate and format that is available from the content delivery service 120. Illustratively, the user device 102 request is received at specific endpoints of the content delivery service 120 or it is determined which content delivery service endpoint is most appropriate for the user device request. Additionally, the content delivery service 120 processes the received encoded segment requests to allow the content delivery service 120 to generate outgoing content streams. Illustratively, the processing of the request can include a number of additional interactions between the user device 102 and the content delivery service 120, including security protocols, handshaking protocols, and the like.

Once the request has been processed, the content delivery service 120, through encoding component 122, generates a set of encoded content chunks, such as in accordance with the CMAF communication protocol. For example, the encoding component 122 can begin generating encoded content segments as encoded content segment chunks as described above. Illustratively, the encoded content segment chunk data includes header information or other meta-data that identifies attributes of the encoded content segment chunks, including the specified size of the individual encoded content segment chunks.

At block 702, the content delivery component 124 can receive the initial set of encoded segment chunk data from the encoder and buffer the received encoded data prior to distribution to a plurality of endpoints that in turn distribute to the individual user devices or clients. At block 704, the content delivery component 124 determines the size of the encoded segment chunks. As described above, the content delivery component 124 can utilize various methodologies to determine the intended or designated size of the encoded data chunk. For example, the content delivery component 124 can inspect header information included in the initial encoded data that specifies a chunk size or that selects from available chunk sizes. In another example, the content delivery component 124 can receive or inspect meta-data that includes description of the intended chunk size. In some embodiments, the specification of chunk size may be consistent for a set of encoded content. In other embodiments, the size of the encoded chunks may be dynamically specified or modified during transmission. As described above, individual chunks are made up of a first portion, such as a Movie Fragment Box ("moof"), followed by one or more payload portions, such as Media Data Boxes ("mdat") portions. Illustratively, the first portion of the chunks includes information that identifies one or more aspects of the chunk including the type of data represented by the payload portion, number of media samples included in the payload portions, durations of the samples in the payload samples, timescale information for the media samples, and the like. For example, the first portion can include markers, such as flags or other identifiers, that the payload portion corresponds to a marker or identifier utilized to delineate information between two or more segments. For example, the payload portion can include an Instantaneous Decoding Refresh ("IDR") marker that is interpreted as a frame in which no frame subsequent to the IDR marker can reference a previous frame prior to the IDR marker. As described herein, in one embodiment, the content delivery component 124 content delivery component 124 can determine characteristics or attributes of the encoded content segments chunks, such as the size, by inspection of the portions of the chunks.

At decision block 706, the content delivery component 124 monitors the buffer of received encoded content segment chunk data to determine whether at least one multiple of the encoded segment chunk data has been received. In one embodiment, the multiple can correspond to a single encoded content chunk. In other embodiments, the multiple can corresponds to two or more content chunks. Illustratively, the content delivery component 124 may be configured with information that determines whether a single or multiple multiplier will be utilized. In other embodiments, the content delivery component 124 may determine the multiplier as part of the inspection of the encoded data, such as designation of minimal chunk transmissions information (e.g., specifying the multiplier) or processing specified levels of redundancy to infer a multiple of chunk size. Still further, the multiple of chunk size may be a default multiplier that can be used absent additional configuration information and does not need to be individually specified.

If a complete encoded chunk has not been received (or multiple), the content delivery component 124 collects encoded content segment chunk data at block 708 and will continue to buffer encoded content segment chunk data at decision block 706. As described above, if the content delivery component 124 does not receive encoded content corresponding to a complete chunk or multiple chunks (e.g., "incomplete encoded chunk data"), the incomplete encoded chunk data has never been replicated and distributed to the plurality of media distribution endpoints. For example, in the event of a failure in the encoding component or network connection, the content management component 124 may not receive complete encoded content chunk data before an elapsed time (e.g., a time out) or prior to notification of the error.

Alternatively, if the received encoded content segment chunk data corresponds to the specified chunk size, the content delivery component 124 releases the buffer to allow the distribution endpoints to receive the encoded content segment chunk to be distributed at block 710. More specifically, at block 710 the content delivery component 124 replicates or causes the replication of the complete encoded chunk data to a plurality of the media distribution endpoints that will be distributing the encoded content. As described above, the content delivery service 120 transmits the set of encoded content chunks to the user device via individual media distribution endpoints. Illustratively, as described above, the transmission of the encoded content chunks can leverage network protocols, such as HTTP, that facilitate the distribution of data chunks over a communication network. Illustratively, the user device 102 receives the chunks and attempts to form content segments in a manner such that there is a reduction in latency that would otherwise be associated with the transmission of data segments.

In some embodiments, routine 700 may continue or repeat to process encoded data chunks for multiple segments. At decision block 712, the content delivery component 124 determines whether a complete set of encoded content segment chunks have been received from the encoding component 122. If not, the routine 700 returns to block 708 to collect and distribute complete encoded content segment chunks. Alternatively, once all the encoded content segment chunks have been received, routine 700 terminates.

Figure 8:
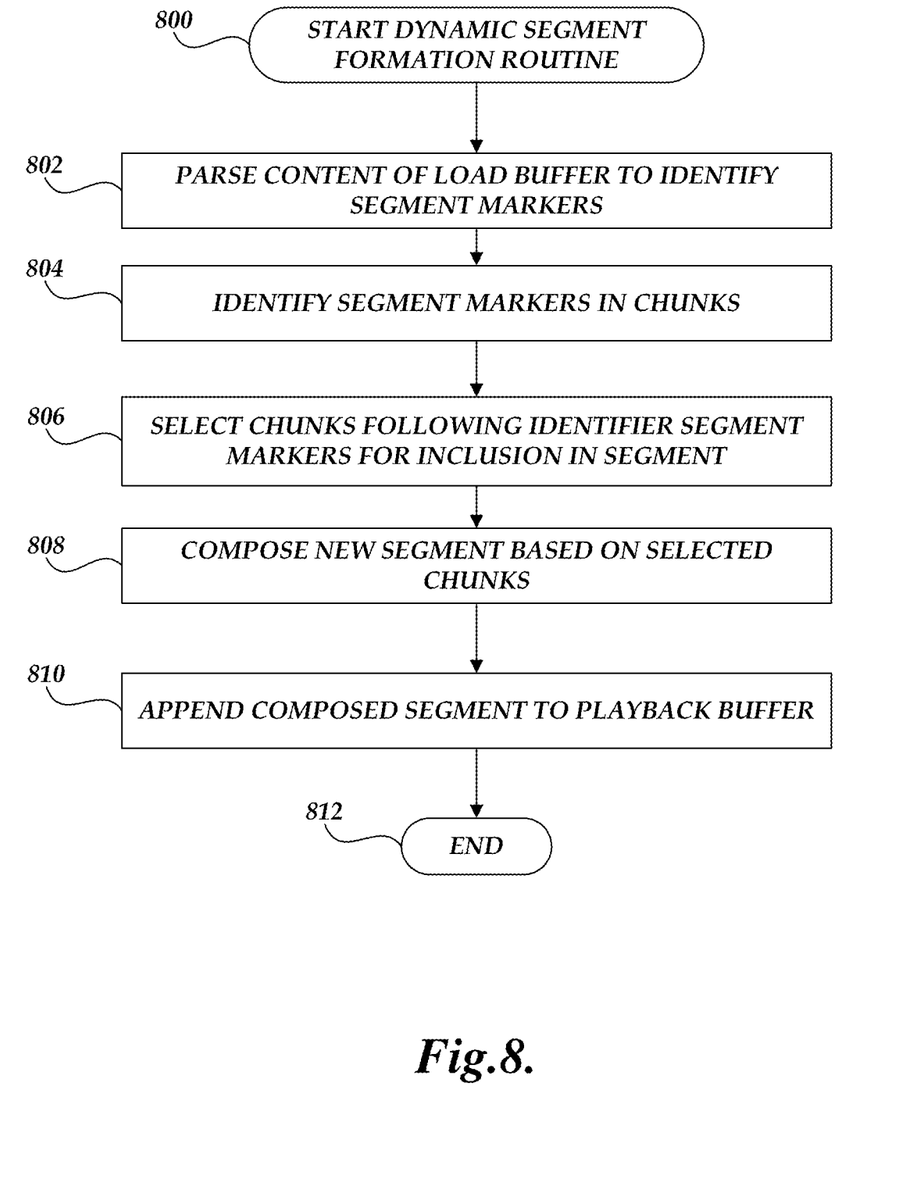

FIG. 8 is a flow diagram illustrative of dynamic content segment formation routine 800 implemented by a user device in accordance with an aspect of the present application. Routine 800 will be described with regard to implementation on a user device, such as by a media processing application. Illustratively, routine 800 may be implemented in scenarios in which the user device 102 attempts to start or re-start playback of a content stream as close to the current time of generation, such as a live streaming event. For example, a user device 101 may experience a rebuffering event for a live streaming event or join a live streaming event in progress. At block 802, the user device 102 parses the set of chunks in the load buffer. At block 804, the user device 102 identifies a marker in the chunk information that is indicative of a reference frame, such as an IDR marker or flag. For example, the chunks can include or be associated with flags or other identifiers that facilitates the identification of an IDR frame. More specifically, in accordance with embodiments associated with the ISO Base Media File Format, sample count information can be defined in a moof box by referencing a "sample_flags" property of a Track Fragment Run Box ("trun") of a Track Fragment Box ("traf") (e.g., moof>traf>trun). As described above, the identification of the IDR marker can be utilized to indicate that the subsequent frames will not reference any frame prior to the IDR frame.

At block 806, the user device 102 can select or identify the chunks immediately following the identified marker to be included in the formed segment. Illustratively, once the chunk having the identified marker is located, the chunk carrying the identified marker and any chunks received subsequent to the identified marker will be utilized to form the segment. At block 808, the user device 102 discards chunks in the set of chunks found prior to the identifier marker as not being part of the initial content segment. At block 810, the user device 102 appends the dynamically formed segment including the identified marker and any identified subsequent chunks into the playback buffer to facilitate the lower latency streaming of content. Routine 800 terminates at block 812.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description.

All changes which come within the meaning and range of equivalency of the claims are to be embraced within their scope.

What is claimed is:

1. A system to manage streaming media content comprising:
a computing device with a processor and memory configured to execute a content delivery management component of a content delivery service, wherein the content delivery management component is configured to:
receive, from an encoding component, encoded content chunk data responsive to a content request for encoded video content, wherein the encoding component is configured to encode video content according to an encoding profile comprising bitrates and video encoding formats to generate the encoded video content, wherein the encoded video content is associated with two or more video segments, wherein each individual video segment of the two or more video segments is organized into a plurality of fragments that sum up to the individual video segment, wherein each individual fragment of the plurality of fragments is organized into a plurality of chunks that sum up to the individual fragment; wherein one or more chunks of the plurality of chunks comprise the encoded content chunk data;
buffer the received encoded content chunk data;
process the buffered encoded content chunk data to determine a specified encoded content chunk size;
determine whether the buffered encoded chunk data corresponds to the specified encoded content chunk size;
responsive to a determination that the buffered encoded chunk data does not correspond to the specified encoded content chunk size, continue to buffer received encoded content chunk data; and
responsive to a determination that the buffered encoded chunk data does correspond to the specified encoded content chunk size, cause a transmission of the received encoded content chunk data to a set of distribution endpoints of the content delivery service.

2. The system of claim 1, wherein the content delivery management component determines the specified content chunk size by inspecting header information included in the received encoded chunk data.

3. The system of claim 1, wherein the content delivery management component determines whether the buffered encoded chunk data corresponds to the specified encoded content chunk size by determining whether a size of the buffered encoded chunk data matches the specified encoded content chunk size.

4. The system of claim 3, wherein the content delivery management component determines whether the buffered encoded chunk data corresponds to the specified encoded content chunk size by determining whether a size of the buffered encoded chunk data matches a multiple of the specified encoded content chunk size.

5. The system of claim 1, wherein the content delivery management component is further configured to discard the buffered encoded content chunk data if an error is detected prior to the determination that the buffered encoded chunk data does correspond to the specified encoded content chunk size.

6. A computer-implemented method to manage processing of encoded media content, the method comprising:
receiving encoded content chunk data from an encoding component that is configured to encode video content associated with two or more video segments, wherein an individual video segment of the two or more video segments is organized into a plurality of sequential fragments, wherein an individual fragment of the plurality of fragments is organized into a plurality of sequential chunks, wherein one or more chunks of the plurality of sequential chunks comprise the encoded content chunk data;
buffering the received encoded content chunk data;
determining whether the buffered encoded chunk data corresponds to a specified encoded content chunk size; and
responsive to a determination that the buffered encoded chunk data does not correspond to the specified encoded content chunk size, receiving additional encoded content chunk data prior to replication of the encoded chunk data.

7. The computer-implemented method of claim 6 further comprising processing the buffered encoded content chunk data to determine the specified encoded content chunk size.

8. The computer-implemented method of claim 7, wherein processing the buffered encoded content chunk data to determine the specified encoded content chunk size includes inspecting header information included in the received encoded chunk data.

9. The computer implemented method of claim 7, wherein processing the buffered encoded content chunk data to determine the specified encoded content chunk size includes receiving meta-data included in the received encoded chunk data.

10. The computer-implemented method of claim 6, wherein determining whether the buffered encoded chunk data corresponds to the specified encoded content chunk size includes determining whether a size of the buffered encoded chunk data matches the specified encoded content chunk size.

11. The computer-implemented method of claim 6, wherein determining whether the buffered encoded chunk data corresponds to the specified encoded content chunk size includes determining whether a size of the buffered encoded chunk data matches a multiple of the specified encoded content chunk size.

12. The computer-implemented method of claim 6 further comprising discarding the buffered encoded content chunk data prior to the determination that the buffered encoded chunk data does correspond to the specified encoded content chunk size.

13. The computer-implemented method of claim 6 further comprising responsive to a determination that the buffered encoded chunk data does correspond to the specified encoded content chunk size, causing a transmission of the received encoded content chunk data to a set of distribution endpoints.

14. The computer-implemented method of claim 6, wherein receiving the encoded content chunk data from the encoding component includes receiving the encoded content chunk data responsive to a request from a user device.

15. A computer-implemented method to manage processing of encoded media content, the method comprising:
receiving encoded content chunk data from an encoding component that is configured to encode video content associated with two or more video segments, wherein individual video segments of the two or more video segments are organized into a plurality of serial fragments, wherein individual fragments of the plurality of serial fragments are organized into a plurality of serial chunks, wherein one or more chunks of the plurality of serial chunks comprise the encoded content chunk data;

determining whether the received encoded content chunk data corresponds to a specified encoded content chunk size prior to transmission to a plurality of distribution endpoints; and responsive to a determination that the encoded chunk data corresponds to the specified encoded content chunk size, replicating the encoded content chunk data to the plurality of distribution endpoints.

16. The computer-implemented method of claim 15 further comprising buffering the received encoded content chunk data.

17. The computer-implemented method of claim 15 further comprising processing the buffered encoded content chunk data to determine the specified encoded content chunk size by inspecting header information included in the received encoded chunk data.

18. The computer-implemented method of claim 15, wherein determining whether the received encoded content chunk data corresponds to the specified encoded content chunk size includes determining whether a size of encoded chunk data matches at least one multiple of the specified encoded content chunk size.

19. The computer-implemented method of claim 15 further comprising discarding the encoded content chunk data prior to the determination that the encoded chunk data does correspond to the specified encoded content chunk size.

20. The computer-implemented method of claim 15 further comprising responsive to a determination that the buffered encoded chunk data does not correspond to the specified encoded content chunk size, collecting additional content chunk data.

* * * * *

UNITED STATES PATENT AND TRADEMARK OFFICE
CERTIFICATE OF CORRECTION

PATENT NO. : 10,893,303 B1
APPLICATION NO. : 16/264196
DATED : January 12, 2021
INVENTOR(S) : Matei Berceanu Mitaru et al.

It is certified that error appears in the above-identified patent and that said Letters Patent is hereby corrected as shown below:

In the Specification

In Column 1, Line 65, delete "embodiment" and insert --embodiment.--.

In Column 3, Line 48, delete "("MPEG)" and insert --("MPEG")--.

In Column 10, Line 22, delete "404 B, 404 C." and insert --404B, 404C.--.

In the Claims

In Column 18, Line 28, Claim 9, delete "computer implemented" and insert --computer-implemented--.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*